United States Patent
Meyers

[11] Patent Number: 6,137,535
[45] Date of Patent: *Oct. 24, 2000

[54] COMPACT DIGITAL CAMERA WITH SEGMENTED FIELDS OF VIEW

[75] Inventor: Mark Marshall Meyers, Hamlin, N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/743,653

[22] Filed: Nov. 4, 1996

[51] Int. Cl.[7] .......................... H04N 5/225; H04N 9/077; G01B 9/04
[52] U.S. Cl. ..................... 348/340; 348/291; 250/208.1
[58] Field of Search .................................. 348/340, 336, 348/273, 291; 250/208.1, 216, 226

[56] References Cited

U.S. PATENT DOCUMENTS

| | | | |
|---|---|---|---|
| 3,910,683 | 10/1975 | Nishino et al. | 350/162 |
| 4,318,123 | 3/1982 | Knop | 358/43 |
| 4,323,925 | 4/1982 | Abell et al. | 358/213 |
| 4,377,753 | 3/1983 | Mir | 250/578 |
| 4,463,383 | 7/1984 | Soneda et al. | 358/212 |
| 4,689,291 | 8/1987 | Popovic et al. | 430/321 |
| 4,708,436 | 11/1987 | Kleinknecht | 350/162.17 |
| 4,733,096 | 3/1988 | Horiguchi | 250/578 |
| 4,994,664 | 2/1991 | Veldkamp | 250/216 |
| 5,004,901 | 4/1991 | Yoshimoto et al. | 250/201.5 |
| 5,076,687 | 12/1991 | Adelson | 356/4 |
| 5,151,790 | 9/1992 | Takatori et al. | 358/225 |
| 5,187,358 | 2/1993 | Setani | 250/208.1 |
| 5,187,360 | 2/1993 | Pasco | 250/208.1 |
| 5,233,174 | 8/1993 | Zmek | 250/201.9 |
| 5,340,978 | 8/1994 | Rostoker et al. | 250/208.1 |
| 5,461,425 | 10/1995 | Fowler et al. | 348/294 |
| 5,471,515 | 11/1995 | Fossum et al. | 377/60 |
| 5,497,269 | 3/1996 | Gal | 359/615 |
| 5,610,390 | 3/1997 | Miyano | 250/216 |
| 5,760,834 | 6/1998 | Rostoker | 348/340 |

FOREIGN PATENT DOCUMENTS

| | | | |
|---|---|---|---|
| 0 825 764 A2 | 2/1998 | European Pat. Off. | H04N 5/217 |
| 0 833 502 A2 | 4/1998 | European Pat. Off. | H04N 3/15 |
| 54154727 | 11/1979 | Japan. | |
| 54154728 | 11/1979 | Japan. | |
| 59193699 | 9/1984 | Japan. | |
| 8-107194 | 10/1994 | Japan | H01L 27/14 |

*Primary Examiner*—Wendy Garber
*Assistant Examiner*—Alicia M. Harrington
*Attorney, Agent, or Firm*—James D. Leimbach

[57] ABSTRACT

A compact digital camera is formed with a lenslet array comprised of a plurality of lenslets, each lenslet has a decentration corresponding to its radial position in the lenslet array so that the axial ray of each lenslet views a different segment of a total field of view. A photosensor array comprised of a plurality of sub-groups of photodetectors is positioned such that each sub-group is located along the axial ray of a respective lenslet. A field limiting baffle comprised of at least one aperture plate is positioned such that the center of the apertures are located along the axial ray of a respective lenslet.

15 Claims, 8 Drawing Sheets

COMPACT DIGITAL CAMERA WITH SEGMENTED FIELDS OF VIEW

CROSS-REFERENCE TO RELATED APPLICATIONS

The present application is related to U.S. application Ser. No. 08/652,735, filed May 23, 1996, entitled, "A Diffractive/Refractive Lenslet Array," by Mark M. Meyers; U.S. application Ser. No. 08/699,306, filed Aug. 19, 1996, entitled, "Compact Image Capture Device," by Mark M. Meyers; and U.S. application Ser. No. 08/720,282, filed Sep. 26, 1996, entitled, "Compact Image Capture Device With Local Image Storage," by Mark M. Meyers.

FIELD OF THE INVENTION

The invention relates generally to the field of digital cameras and more particularly to an improved image sensor with a lenslet array, having a smaller number of lenslets and a larger number of photodetectors per lenslet than here-to-fore used, along with associated electronics being inserted in the unused spaces between spaced apart sub-groups of photodetectors.

BACKGROUND OF THE INVENTION

Lenslet arrays have been used to concentrate light, imaged on a photodetector plane by a photographic objective, into smaller areas to allow more of the incident light to fall on the photosensitive area of the photodetector array and less on the insensitive areas between the pixels. This has been described in papers such as "Visible Array Detectors" by Timothy J. Tredwell, from *Handbook of Optics, Vol. 1, Fundamentals Techniques, & Design, Second Edition*, Chapter 22, pp. 32–34. These lenslet arrays are centered directly above the corresponding photosensor and are not designed to look at different portions of the field of view independently. Rather, they concentrate the light from an existing image, formed by the photographic objective, into the pixel aperture.

In U.S. Pat. No. 4,994,664, entitled, "Optically Coupled Focal Plane Arrays Using Lenslets And Multiplexers" by Veldkamp, an array of diffractive lenslets is used to concentrate incident light onto an array of photosensors in order to allow for location of amplifying circuitry in areas between photosensor sites. These lenslets are centered over the photosensitive sites and are formed on the opposite side of the photosensor array on a silicon substrate, the use of the silicon substrate prevents them from imaging visible light onto the photosensors since silicon does not transmit in the visible wavelengths. That invention is not be able to work over the visible wavelength range since the element is composed of all diffractive optical power and suffers from severe chromatic aberrations.

In U.S. Pat. No. 5,233,174, entitled, "Wavefront Sensor Having A Lenslet Array As A Null Corrector" by Zmek, teaches an array of diffractive lenslets with decenters that are adjusted to eliminate the local monochromatic wavefront tilt from a specific optic under test in an interferometric or Hartman type test. A Hartman test is used to certify the surface quality of various optics. If the optics under test falls within the acceptance criteria, the wavefront incident on the sensor array will form centered light spots on predetermined pixels. If the wavefront is other than the desired wavefront, the light spots will be incident on different pixel elements. That invention is not applicable to the current invention since the centered lenslets are not looking at angularly displaced sections of a larger field of view. It is also not applicable to white light applications due to the chromatic aberrations of the diffractive lenslets.

U.S. Pat. No. 5,340,978, entitled, "Image-Sensing Display With LCD Display Panel And Photosensitive Element Array" Rostoker et al., briefly describes an array of decentered lenses which form an image of a segment of the field of view. These lenses are widely separated and do not include a method for limiting a field of view seen by a group of pixels. The use of the widely separated pixels will greatly increase costs of the sensor since there will be fewer sensor arrays fabricated on a given size substrate or wafer which will cause a decreased yield of finished sensor arrays for a given manufacturing process. There is no discussion of the trade-off between the focal length of the lens array and the angular subtense of the pixel's field of view. If the focal length of the lenslets is too short, light from one angular location which is incident on one group of pixels will also be within the field of view of an adjacent group. For very short focal lengths the corresponding pixel dimension required for an equivalent angular resolution will be so small as to not be able to be fabricated with lithographic processes. If the pixel dimension is reduced too much the light gathering area of the pixel will be so small as to not generate a reliably measurable number of electrons for a given incident intensity. Rostoker does not envision the use of diffractive/refractive hybrids for achromatization. That patent uses an array of uniformly shaped lenslets, while in the present invention the utility of varying the surface profile of the lenslets as a function of their radial position in the lenslet array allows for a higher level of aberration correction at any given location. In the current invention the lenses are abutted to each other and an opaque baffle is placed over the photodetector to limit the field of view of each pixel. The referenced patent uses one lenslet per group of three color pixels. In the current invention it is shown to be advantageous to form a small array of pixels for each lenslet if the focal length of each lenslet is adjusted appropriately (increased).

The invention disclosed in U.S. Pat. No. 5,471,515, to Fossum, et. al., entitled "Active Pixel Sensor with Intra-Pixel Charge Transfer," converts the photogenerated charge stored under the photogate of a semiconductor photosensor into a voltage by transferring the charge to a sense node (typically a capacitor) located within the active pixel unit cell. Fossum then utilizes dual sample correlated double sampling of the voltage based signal to reduce signal noise and eliminate the effect of dark current from the photosensor. The voltage associated with the image exposure is then subtracted from the voltage associated with a read during a dark sample by a voltage differencing amplifier located at the end of the row or column of the photosensors. By using appropriate row and column select data lines, a subsection of the array can be read out without the need to read out the entire image array. The Fossum invention does not however enable an increase in the overall sensitivity of the photosensor (CCD detector) elements, nor does it envision the utilization of an array optic type structure to form an image of different segments of a field of view, although the patent does disclose the use of a lens array for concentrating light on the active pixel. Fossum is performing most of the signal processing in a voltage amplification mode, whereas the present invention utilizes the advantages of a current mode signal processing. In addition, the present invention provides for the digitization and storage of the digital image data at each photosensor site.

In U.S. Pat. No. 5,004,901, entitled "Current Mirror Amplifier for use in an Optical Data Medium Driving Apparatus and Servo Circuit" by Yoshimoto, et. al., a photogenerated current from an optical disk tracking and read sensor is amplified in fixed steps by a switchable series of current mirrors where the current mirrors achieve current multiplication through the use of output stages that incorporate either multiple output transistors with the bases of the output transistors connected in parallel, or by the use of output transistors with emitter areas that are integral multiples of the emitter areas of the input side transistor. The purpose of Yoshimoto's invention is to allow the utilization of received photocurrents with a large dynamic range by multiplying the input current by an adjustable ratio where the multiple current ratios are selected through a switchable network of differential amplifiers. Yoshimoto's invention is not related to the field of array image sensors and requires the use of a switchable array of differencing amplifiers. Yoshimoto's invention does not integrate the current from the photosensor and the current is continuously generated by received light from the laser light emitted by the optical disk head. The sensor is not exposed to an image as in the current invention, but is used in a continuous optical disk position monitoring mode. Yoshimoto does not utilize dual slope correlated double sampling for noise reduction as disclosed in the present invention. Yoshimoto does not make any mention of the use of array optics with a field of view which varies as a function of radial position in the sensor array.

SUMMARY OF THE INVENTION

The present invention is directed to overcoming one or more of the problems set forth above. Briefly summarized, according to one aspect of the present invention there is provided a compact digital camera, comprising:

a lenslet array comprised of a plurality of lenslets, each lenslet having a decentration corresponding to its radial position in the lenslet array so that the axial ray of each lenslet views a different segment of a total field of view;

a photosensor array comprised of a plurality of sub-groups of photodetectors, each sub-group positioned along the axial ray of a respective lenslet; and a field limiting baffle comprised of at least one aperture plate where the center of the apertures are positioned to lie along the axial ray of a respective lenslet.

ADVANTAGEOUS EFFECT OF THE INVENTION

The present invention has the following advantages:

An extremely compact digital camera with a lenslet array in close proximity to a photodetector array is formed. Due to the larger sub-image size a reduced number of lenslets are needed to construct the full image. By utilizing the space between sub-groups of photodetectors for signal processing electronics, the digital camera can be formed on a single substrate. In addition, a large high resolution sensor can be synthesized by the use of sub-groups of photodetectors.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1A:
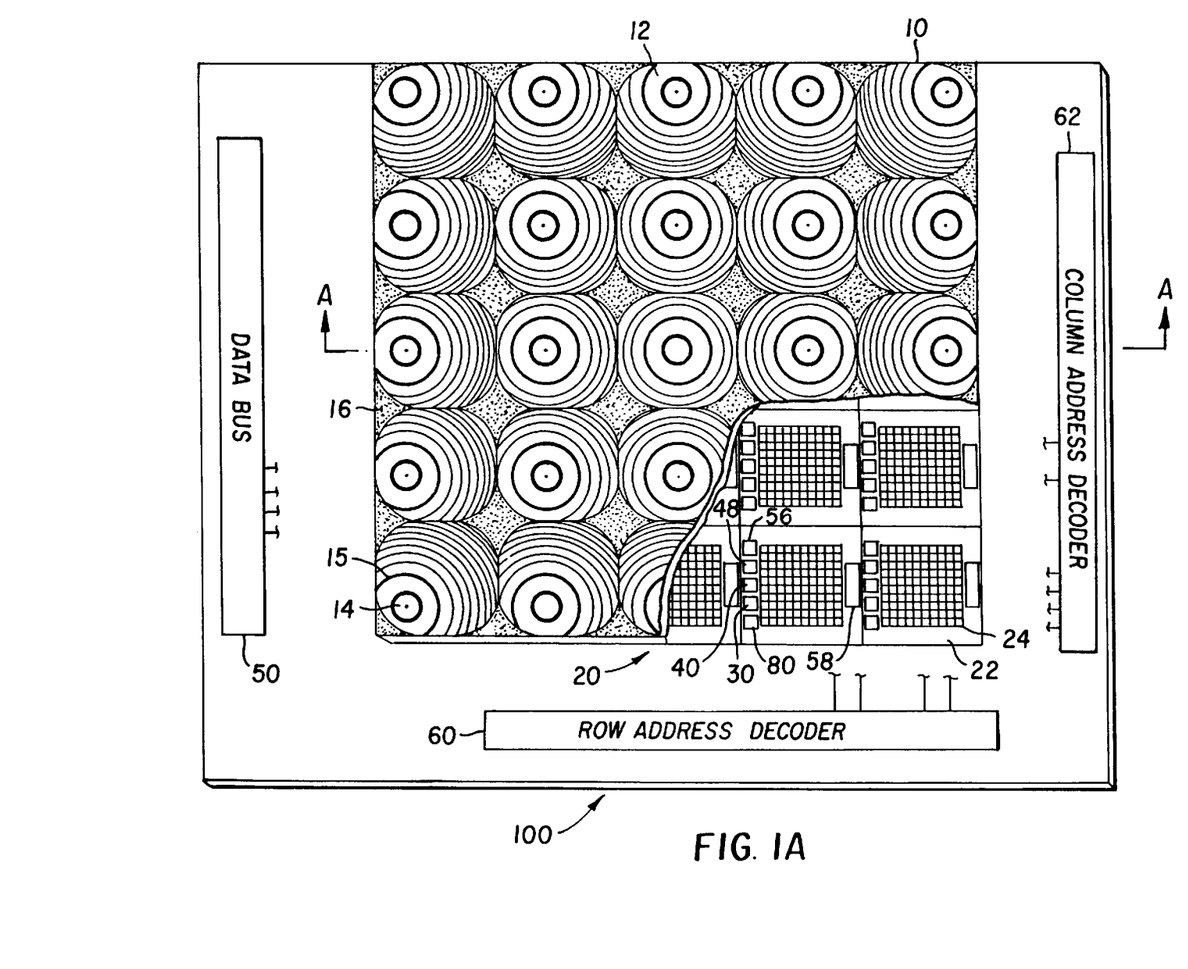
FIGS. 1A and 1B are, a top view of lens contours and baffles for the lens array, and a block diagram of a photodetector array incorporating the unit pixel subassemblies and associated memories at each site, and an exploded view of a portion of the arrays of FIG. 1A, respectively.
Figure 1B:
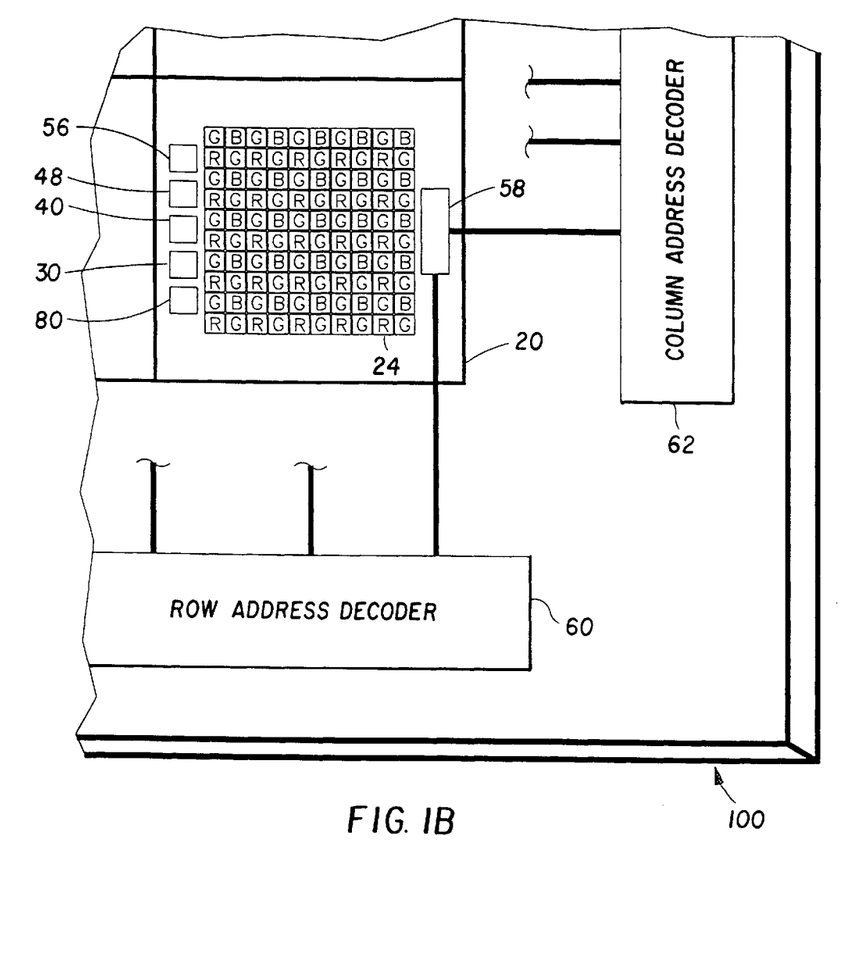
Figure 2:
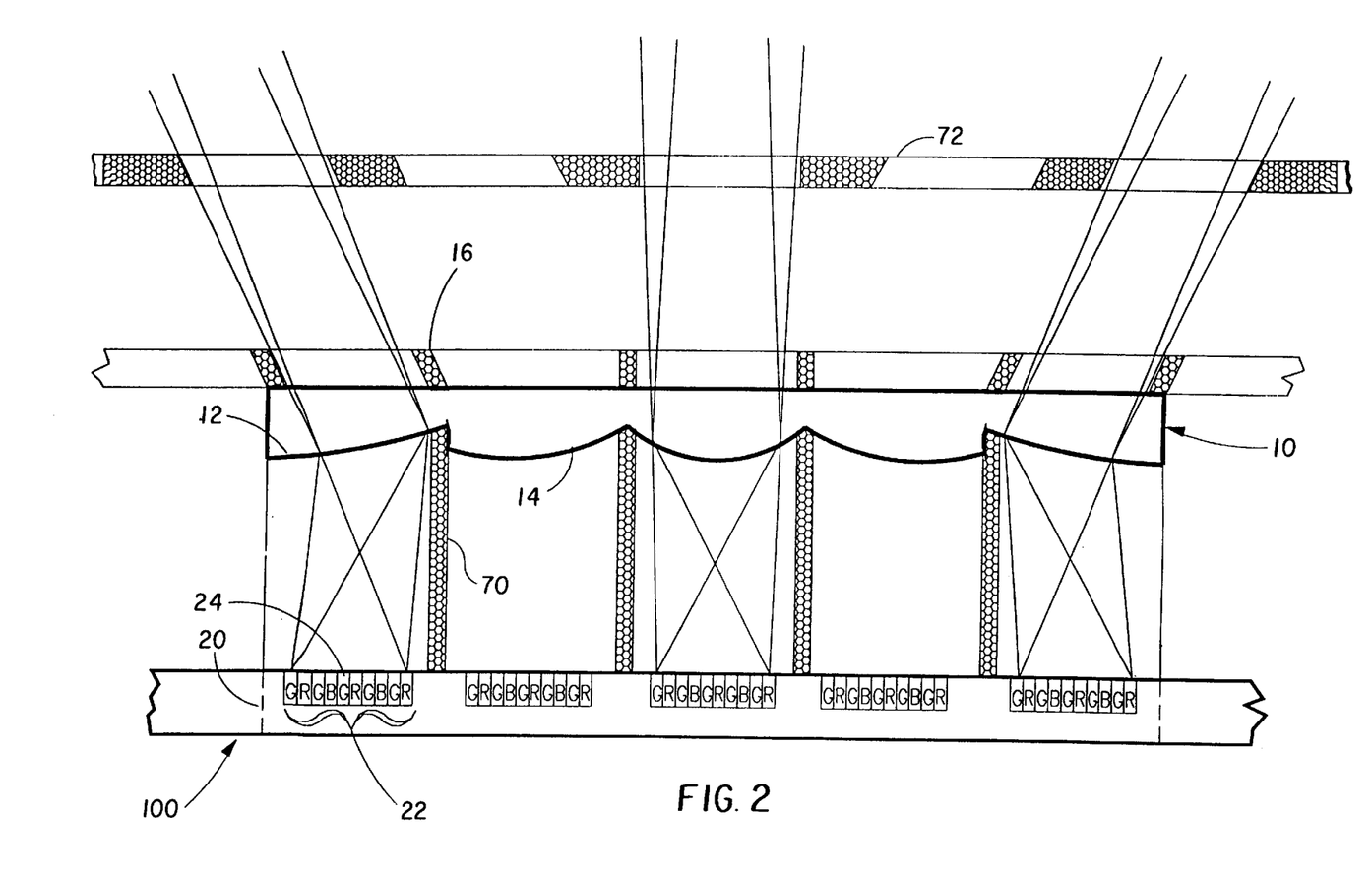
FIG. 2 is a sectioned view taken along the section lines A—A of the lens array of FIG. 1A.

Referring to FIGS. 1A and 1B, a lenslet array 10 is formed with an array of achromatized refractive/diffractive lenslets 12 or refractive lenslets which are centered over sub-groups 22 of photodetector 24 formed into a photosensitive array 20 (shown more clearly in the section view of FIG. 2). To be observed in FIG. 1A is that the center of the mechanical optical axis 14 of each lenslet 12 is displaced relative to the fixed sensor-to-sensor distance as a function of its radial distance from the optical axis of the central lenslet. The lines 15 appearing around the mechanical optical axis 14 of each lenslet 12 are topographical lines indicating changes in height of the lenslet's surface. An opaque mask 16 fills the areas between the lenslets 12 to prevent light that would by-pass the lenslets from reaching the photosensitive array 20. The lenslet array 10, depicted in FIG. 1A represents only a small portion of an array that will be used in an actual camera. In an actual implementation approximately 150× 100 lenslets are used to form the lenslet array 10 each having an associated sub-group of photodetectors 22 formed with 10×10 photodetector elements 24.

In order for the lenslet array 10 to see different fields of view, the optical axis 14 of the lenslets 12 in the lenslet array 10 are located at a distance which becomes progressively larger than the center-to-center distance of the sub-groups of photodetectors 22 in the photosensor array 20. The displacement of the lenslets optical axis 14 increases radially from the center of the lenslet array 10. Decentering a lenslet's optical axis tends to bend rays from off-axis field angles into the center of the lenslet's field of view. By moving the optical axis of the lenslet further out radially with increasing distance from the center of the lenslet array 10, the angular location of an object at the center of the field of view for a given lenslet/sub-group of photodetectors originates from increasingly off-axis segments of the total field of view (shown more clearly in FIG. 2).

For instance, the required decenter for a lenslet of focal length $FL_i$ necessary to deflect a ray from the desired field angle into the center of the lenslets associated sub-group of photodetectors 22 can be determined from the paraxial ray tracing equations. The paraxial equations are $$y' = y_o + nu(t/n)$$

$$n'u' = n_o u_o - y\phi$$

where
y'=height after propagation to next surface
$y_o$=height at previous surface
u=paraxial slope angle (radians)
$u_o$=slope angle before refraction
φ=power of lenslet (φ=1/f)
n=refractive index of the lenslet's medium Therefore, the displacement d for a given lenslet with power φ (where φ=1/f) that is necessary to bend the central ray from a given angle of incidence $u_o$ to a desired angle u', after refraction is given by $$d = y = (n_o u_o - n'u')/f$$

where f=focal length of the lenslet

The invention utilizes an array of lenslets where the local displacement d of each lenslet's optical axis varies as a function of its radial position r relative to the optical axis of the lenslet positioned in the center of the lenslet array; so that, to first order $$d(r) = (n_o u_o(r) - n'u'(r))/f$$

The invention consists of adjusting the lenslet decenters so that u' (r)=0 for the central ray within a given lenslet's field of view (see FIG. 2). In this case the decenter necessary for a given lenslet is approximately a linear function of the lenslet's radial distance from the center lenslet's optical axis.

Each sub-group of photodetectors 22 may be provided with associated array electronics dispersed in the open spaces on or in a supporting substrate 100. The array electronics may contain a multiplexing and clocking circuit 80, current mirror 30, a correlated double sampling circuit 40, an analog-to-digital converter 56, a sub-image pixel inverter 48, and a non-volatile memory cell 58. Each sub-group of photodetectors 22 is attached to a data bus 50 in response to signals from a row address decoder 60 and a column address decoder 62. FIG. 1B illustrates a preferred positioning of green, blue, and red photodetector elements 24 for a color sensitive array.

Referring now to the cross-section view of FIG. 2, the lenslet array 10 is positioned over a photosensor array 20 that may be a CCD array having a number of sub-groups of photodetectors 22 corresponding in number to at least the number of lenslets 12 forming the lenslet array 10. In a three color environment up to one third of the photodetector elements 24 in each sub-group of photodetectors 22 would be provided with a given color filter (red, green, or blue). The lenslet array 10 is maintained a distance apart from the surfaces of the photodetector elements 24 by spacers 70 that may also serve the function of being baffles. The opaque masks 16 on the lenslet array 10 combined with a field stop aperture plate 72 limits the field of view of any particular sub-group of photodetectors 22 so that it does not overlap the field of view of it neighbors by a large amount. The field stop aperture plate 72 is positioned approximately 0.5 mm to 3 mm from the surface of the lenslet array 10. The field stop aperture plate 72 may be a layer of clear glass having an opaque mask pattern formed on one of it's surfaces.

The center of the apertures in the aperture plate 72 are aligned to the center of the field of view of a corresponding lenslet. The spacing of the centers increases as a function of each lenslet's radial position radially from the center of the lenslet array causing the aperture plate to be slightly larger than the associated lens array. The combination of the opaque masks 16 with the aperture plate 72 and a given lenslet focal length determines the field of view for a sub-group of photodetectors 22. The lenslet array 10 can be formed of etched quartz, injection molded plastic, or an epoxy replica on a glass substrate.

The lenslets 12, combined with the appropriate field stop aperture plate 72, form images of a small segment of the field of view on each sub-group of photodetectors 22. By forming the lenslets 12 with decentrations of the mechanical optical axis 14 which increase radially across the CCD array, the angle the axial ray (which is incident on a respective sub-group of photodetectors), makes with the surface normal to the photosensor array 20 will increase as a function of the radial position of a sub-group of photodetectors 22 with respect to the center of the photosensor array 20. Therefore, appropriately adjusting the decenters of each lenslet associated with a sub-group of photodetectors will allow the sub-group of photodetectors to view a different segment of a scene. The sub-images from each sub-group of photodetectors will be digitally inverted and stitched with the other sub-images to form a composite image as will be explained in the discussion of FIG. 9. Therefore, any camera system incorporating the present invention can be extremely compact and flat. The camera can work in black and white or in color if color filters are used on an appropriate number of photodetector elements in the sub-group of photodetectors.

An array of refractive a spheric lenslets can also be used to form images on the photosensor array. However, the aforementioned embodiment does not correct for the variation in focal length as a function of wavelength since the lens element is formed from a single refractive material, therefore the spot size of the incident light varies as a function of color. An improved optical design, including a diffractive/refractive hybrid lens is used to correct the chromatic aberration in a single material.

The imaging properties of diffractive optics are strongly wavelength dependent. When modeling a diffractive optic this phenomena can be represented as a direct dependence of equivalent refractive index on wavelength:

$$n(\lambda) = [\lambda_c/\lambda](n_c - 1) - 1$$

Diffractive elements impart all of their wavefront bending in an extremely thin layer. This is accounted for in the Sweat model by modeling the diffractive surface as a very high index material ($n_c$_10,000) with very low curvatures (weak surfaces) on each surface. The corresponding focal length can then be determined from:

$$f(\lambda) = [n(\lambda) - 1]\Delta c$$

so that $$f(\lambda) = (\lambda_c/\lambda)f_c$$

where $\lambda_c$=design center wavelength

The Sweat model is disclosed in "Designing and Constructing Thick Holographic Optical Elements," by W. C. Sweat, Applied Optics/vol. 17, No. 8, Apr. 15, 1978, pp. 1220–1227.

The resultant dispersion $v_{diff}$ of the diffractive element is:

$$v_{diff} = \frac{n(\lambda_c) - 1}{n(\lambda_S) - n(\lambda_L)}$$

which reduces to:

$$n_{diff} = \frac{l_c}{l_S - l_L}$$

For designs using:

$\lambda_c = 587\,nm$ $\lambda_s = 486\,nm \quad v_d = -3.5$ $\lambda_L = 656\,nm$ For other wavelength bands of interest an appropriate $v_{diff}$, and element power distribution can be calculated. The direct dependence of the equivalent refractive index on wavelength leads to a small, negative $v_{diff}$, and a high level of wavelength dispersion associated with a first order (m=1) diffractive optical element.

Due to the variation of refractive index with wavelength, a single element lens has a variation of focal length with wavelength. Two materials with different dispersions can be used to form a doublet lens which has the same focal length at two wavelengths and reduced variation over the whole spectrum. The relative distribution of focal powers required to achieve this is given by $$\phi_{ref} = \frac{v_{ref} * \phi_{total}}{v_{ref} - v_{diff}}$$

$$\phi_{diff} = \frac{v_{diff} * \phi_{total}}{v_{diff} - v_{ref}}$$

The negative $v_{diff}$ of the diffractive surface allows for achromatization of single element hybrid refractive/diffractive lenses utilizing a positive focal length diffractive and refractive component. It also decreases the focal length and F/# required of the doublet component lenses, because a refractive doublet consists of a positive crown (low dispersion) lens with a shorter focal length and smaller F/# than is required for a singlet with an equivalent focal length, and a negative flint element which increases the doublet focal length to the correct value and compensates for the dispersion of the positive lens. This effect also decreases the size and weight of the positive element of a hybrid refractive/diffractive element.

For traditional achromatization in the visible spectrum (d-e-f lines) with PMMA plastic lenses, the fraction of power in the refractive and diffractive portions would be $\phi_{ref}/\phi_{total}$=94.25%

$\phi_{diff}/\phi_{total}$=5.75%

It is obvious to a person skilled in the art that one can fabricate the lens array as a quartz master, an epoxy replica on a glass substrate, or as an injection molded part.

The use of diffractive/refractive hybrid achromatization enables the use of diffractive surfaces with longer focal lengths and higher F/#'s. The high F/# makes the diffractive element easier to manufacture due to the large zone spacings. For instance, for a lens with FL=3.0 mm and a F/#=2.0 the first order analysis of he refractive and diffractive portions would provide focal lengths and F/#'s of $f_{ref} = 3.18\,mm \quad F/\# = 2.12$ $f_{diff} = 52.2\,mm \quad F/\# = 34.8$ Assuming the diffractive portion of the lenslet was used purely for first order chromatic correction.

Figure 3A:
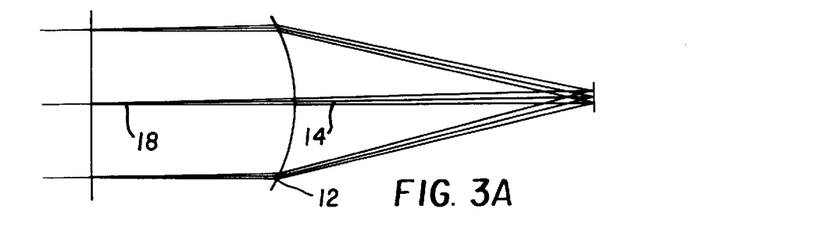
FIGS. 3A, 3B, and 3C, illustrate in cross section a central lenslet and the associated tangential and sagittal ray aberration curves, respectively.
Figure 3B:
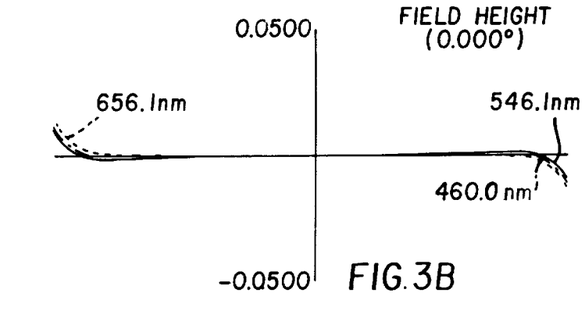
Figure 3C:
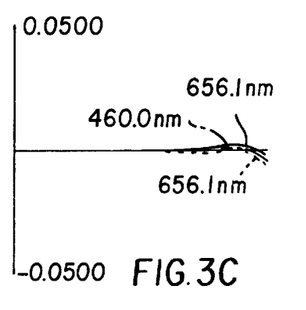
Figure 4A:
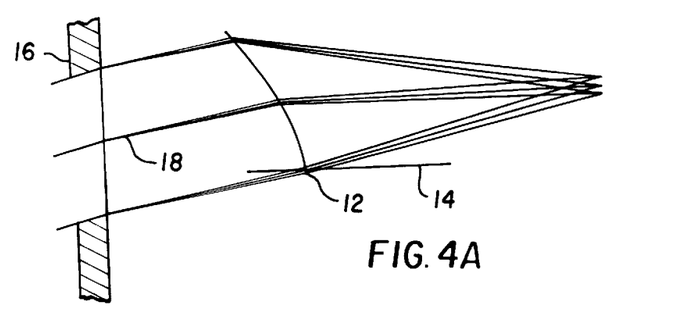
FIGS. 4A, 4B, and 4C, illustrate in cross section a lenslet at a 16 degree field angle and the associated tangential and sagittal ray aberration curves, respectively.
Figure 4B:
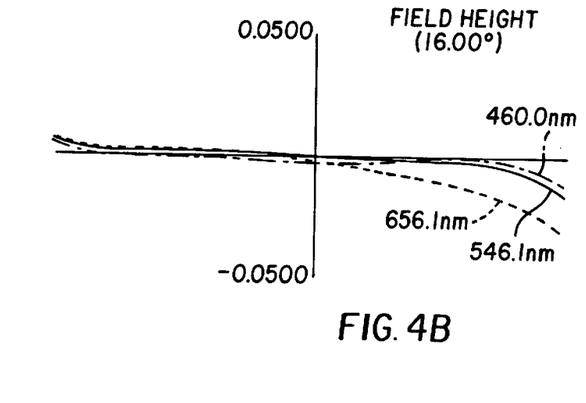
Figure 4C:
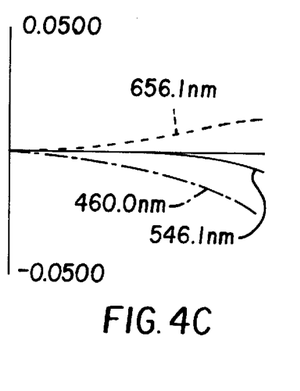
Figure 5A:
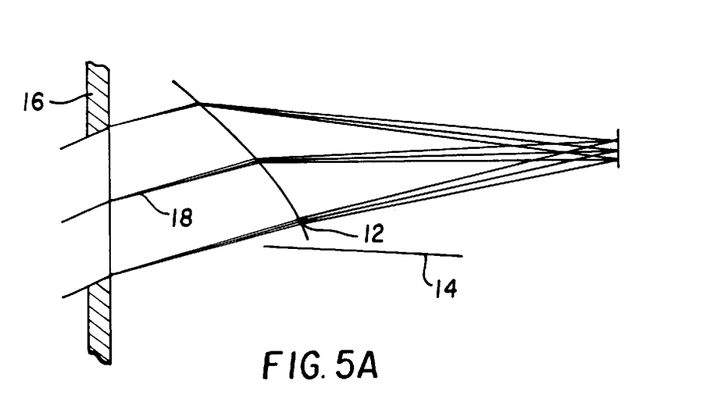
FIGS. 5A, 5B, and 5C, illustrate in cross section a lenslet at a 26 degree field angle and the associated tangential and sagittal ray aberration curves, respectively.
Figure 5B:
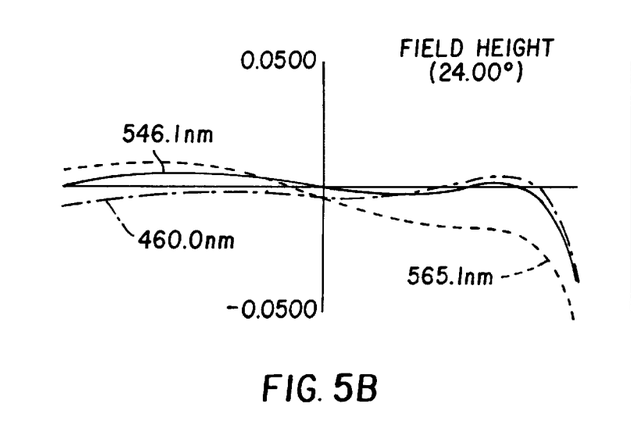
Figure 5C:
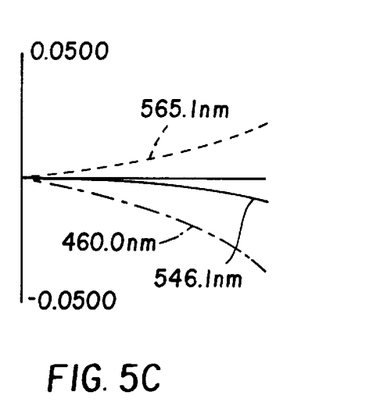

The diffractive lenslets 12 are shown in FIGS. 3A, 4A, and 5A, for the on-axis, 16 degrees, and full field of view. To be noted in a comparison of these figures is that the mechanical optical axis 14 is moving radially outwards as a function of field angle while the local optical axis 18 is incident normal to the plane of the photosensor array 20. To be noted is that the opaque mask 16 acts as the aperture stop for the system as well as limiting the field of view of a given photosensor FIGS. 3B, 3C, 4B, 4C, 5B, and 5C, represent the tangential and sagittal ray aberration curves for their respective lenslets. The solid lines represent a wavelength of 546.1 nm, the dotted lines represent a wavelength of 656.1 nm, and the dotted and dashed lines represent a wavelength of 460.0 nm which represent light in the green, red, and blue, wavelengths.

The focal length of the lenslet must be long enough so that when an image is formed on a given number of photodetector elements the angular resolution in the sub-group of photodetectors is comparable to the angular resolution achieved by prior art digital cameras. This establishes the lower bounds for the focal length of the lenslet in the 2–5 $\mu$m range for pixels of 3–10 microns in width.

The following table lists the optical design parameters for three lenslets with an axial ray incident at 0, 16, and 24 degrees. Other lenslet surface profiles at intermediate field angles are derived by interpolating surface data between the profiles at these field angles.

EXAMPLE A

0 Degree Field Lens
EFL=3.0 mm
F/#=2.0

| Surface No. | Radius | | Thickness | | Glass | |
|---|---|---|---|---|---|---|
| Object | | | Infinity | | Air | |
| 1 Aperture Stop | | | 2.0 | | BK7 | |
| 2 Aspheric Coeff. | −1.639 k = 0.973 AD = 1.04 × 10⁻¹ AE = −3.35 × 10⁻² AF = 1.17 × 10⁻¹ AG = −7.75 × 10⁻² | | 3.0 Diffractive Coeff. Element Decenter DC = 0.0 | | Air DF3 = −8.2 × 10⁻³ DF5 = −8.4 × 10⁻³ DF10 = −8.3 × 10⁻⁵ DF14 = 1.4 × 10⁻³ DF21 = 4.5 × 10⁻⁴ DF27 = −2.3 × 10⁻³ | |
| Image | | | | | Air | |

EXAMPLE B

16 Degree Field Lens
EFL=3.0 mm
F/#=2.0

| Surface No. | Radius | Thickness | Glass |
|---|---|---|---|
| Object | | Infinity | Air |
| 1 Aperture Stop | | 2.0 | BK7 |

-continued

| Surface No. | | Radius | Thickness | | Glass |
|---|---|---|---|---|---|
| 2 | | −1.602 | 3.0 | | Air |
| 2 | k = | −0.670 | Diffractive | DF3 = | −4.8 × 10⁻⁴ |
| Aspheric | AD = | −7.0 × 10⁻³ | Coeff. | DF5 = | −4.7 × 10⁻³ |
| Coeff. | AE = | 2.1 × 10⁻² | | DF10 = | 1.4 × 10⁻² |
| | AF = | −5.9 × 10⁻³ | | DF14 = | −3.6 × 10⁻³ |
| | AG = | 6.5 × 10⁻⁴ | | DF21 = | −5.2 × 10⁻³ |
| | | | | DF27 = | 6.2 × 10⁻⁴ |
| | | | Element Decenter | DC = | −0.513 |
| Image | | | | | Air |

EXAMPLE C

24 Degree Field Lens
EFL=3.0 mm
F/# =2.0

| Surface No. | | Radius | Thickness | | Glass |
|---|---|---|---|---|---|
| Object | | | Infinity | | Air |
| 1 Aperture Stop | | | 2.0 | | BK7 |
| 2 | | −1.509 | 3.0 | | Air |
| Aspheric | k = | −0.570 | Diffractive | DF3 = | 7.8 × 10⁻³ |
| Coeff. | AE = | −4.6 × 10⁻³ | Coeff. | DF5 = | 5.2 × 10⁻³ |
| | AF = | 9.5 × 10⁻³ | | DF10 = | 1.0 × 10⁻² |
| | AG = | −1.2 × 10⁻³ | | DF14 = | −6.3 × 10⁻² |
| | AH = | 1.4 × 10⁻⁴ | | DF21 = | −2.9 × 10⁻³ |
| | | | | DF27 = | 7.3 × 10⁻⁴ |
| | | | Element Decenter | DC = | −0.872 |
| Image | | | | | Air | where the a spheric surface profile is defined by $$z(r) = \frac{cvr^2}{1 + \sqrt{1 - (k+1)cv^2r^2}} + ADr^4 + AEr^6 + AFr^8 + AGr^{10} + AHr^{12}$$

and the diffractive phase profile is defined as $$\phi(r) = \frac{2\pi}{\lambda_0}(DF_3 x^2 + DF_5 y^2 + DF_{10} x^4 + DF_{14} y^4 + DF_{21} x^6 + DF_{27} y^6)$$

where $\lambda_0$=546.1 nm

Although the lenslet array can operate at low F/#'s (F/2.0), it is advantageous to minimize the lenslet's diameter (increasing F/#) so as to minimize the space between lens elements and therefore the image sensor's overall dimensions. If one can achieve higher photo-signal gain with local signal processing electronics, lenslets with smaller numerical apertures can be used to generate the same level of photocurrent. This is accomplished by utilizing a multiplying current mirror.

The illumination incident on the photodetector array from a given lenslet is proportional to the (F/#)². Therefore, if the sensitivity is increased by x, the F/# can be reduced by $x^{1/2}$. For instance, if an array optic camera, without a multiplying current mirror, is used with a lenslet having a F/#=4.0 and a FL=3.0 mm, the lenslet's diameter would be 750 $\mu$m. Therefore, if an array optic camera is formed with 780 by 640 pixels the length of the long dimension of the array would be 58.5 mm, assuming an array of 10×10 photodetector elements in each sub-array. This would require a large area of silicon per photosensor array which would increase part costs and result in lower yields of photosensors from a given wafer size. By incorporating a current mirror with a multiplication factor of 16 at each sub-array of photodetectors, the lenslet diameters can be reduced by 4× to 187 $\mu$m and the length of the array will be reduced to 14.6 mm, resulting in higher photosensor yields and lower part costs. A digital camera can utilize this technique with little decrease in usable photosensitive surface areas since the space between each sub-group of photodetectors is not utilized for light detection. In optimizing the design of the camera, the area between sub-groups of photodetectors can be minimized to allow space only for the necessary support circuitry.

The extra area between the sub-groups of photodetectors may be used for the incorporation of analog circuitry, sub-image pixel inverters, and from 1 to n non-volatile memory cells. The larger the number of memory cells, the larger the number of images that can be stored. The use of appropriate memory (for instance, flash memory) allows for the storing of image data even when the power to the camera is turned off. It is also possible to use DRAM memory at the photosites given that it is acceptable to include refresh circuitry. DRAM memory can be constructed using less surface area which allows for either a smaller distance between the sub-groups of photodetectors or more area for the storage of more image data.

Figure 6:
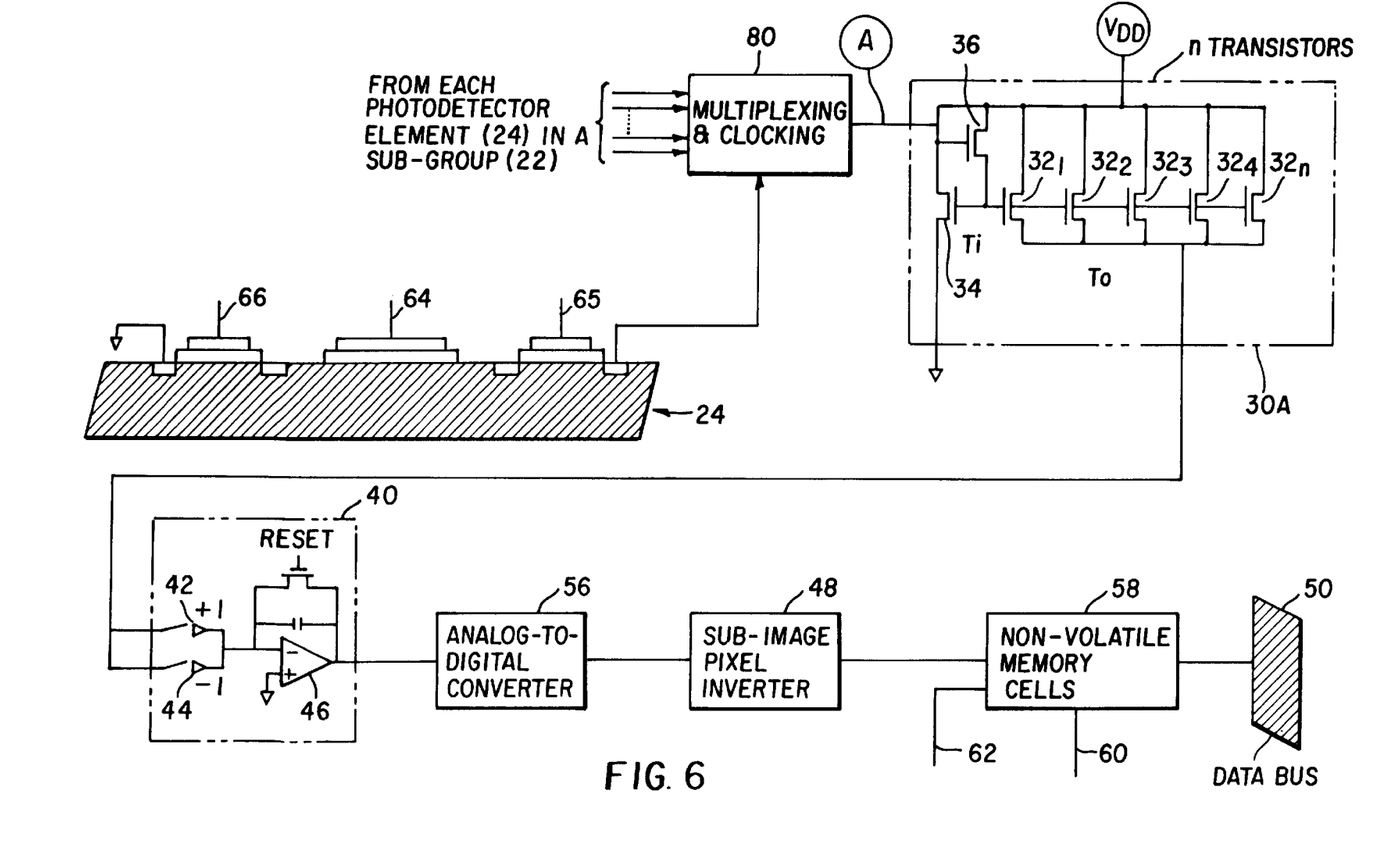
FIG. 6 is a schematic diagram of one unit photodetector element of a sub-group connected to common circuits and used in a device such as a camera to capture an image.

Referring to FIG. 6, the photodetector element 24 may incorporate a CCD device and/or a photodiode. The output of the photosensitive detector 64 is connected to a transfer gate 65 and to a reset gate 66. The output of the transfer gate 65 is connected to the current mirror 30A through multiplexing and clocking circuitry 80. The transfer gate 65 allows the charge, accumulated by the photosensitive detector 64 during the exposure period, to be transferred to the multiplying current mirror 30A at the desired time by the multiplexing and clocking circuit 80. When closed, the reset gate 66 allows for the emptying of the photosensitive element's accumulated charge from the previously completed exposure. When the reset gate 66 is opened and the camera's mechanical shutter is closed (or current from an opaquely masked photodetector is used), the output from the photosensitive detector 64 is integrated for a time equivalent to the previous exposure time so as to cancel dark current and noise. This cancellation occurs within a correlated double sampling circuit (CDS) 40. The integrated signal from the CDS circuit 40 is digitized by an analog-to-digital converter 56 and the resulting digital value is processed by the sub-image pixel inverter 48 and then stored in a non-volatile memory 58, which may be a SRAM memory. The digital value can be output to the main data bus 50 by accessing the unit sub-array through row and column address decoders 60 and 62, respectively. The image data may be stored at site and/or downloaded after each capture. The photosensor array 20 is then ready for exposure to a new image. Each photodetector element 24 in a sub-group of photodetectors 22 is connected to an individually assigned input to the multiplexing and clocking circuit 80. In operation then, the outputs from each photodetector element are serially connected (one at a time) to the current mirror 30A.

As is well known, the output of the current mirror 30A is a multiple of the current produced by the photodetector element 24. The current multiplying effect is traditionally accomplished either by connecting the bases or gates of the transistors $32_1$ through $32_n$ in parallel with each other or by making the emitter (or source) areas larger by an integral multiple of the emitter area of an input side transistor 34. Current mirrors of this type operate on the principle that the emitter base voltage (or the gate source voltage) for all the transistors in the current mirror are the same so that each of the collector (drain) currents is the same and therefore the sum of the currents from the output side $T_o$ is a multiple of either the number of transistors in the output side or the ratio of the area. This current multiplication is represented mathematically as follows:

$$I_{out}=n*I_{in}$$

where n=number of transistors on the output side "$T_o$" of the current mirror or $n=A_{out}/A_{in}$=the ratio of emitter areas With detailed analysis it can be shown that output current is not as simple as the above equation and is more accurately represented by $$I_{out}=n*(I_{in}/(1+\beta))$$

where

β=transistor current gain (typically between 50 and 200)

In another embodiment of the current mirror 30A, a transistor 36 can be added to the input side $T_i$ of the current mirror to drive the bases (or gates) of the output side $T_o$ of the current mirror and thereby reduce the effects of leakage current. This is known to reduce the non-ideality of the above equation to $$I_{out}=n*(I_{in}/(1+\beta))$$

The output of the current mirror 30A is switched between two current amplifiers, amplifiers 42 and 44, with gains of +1 and –1, respectively. When the photosensitive detector 64 is receiving incident light its amplified current is switched through the +1 gain of amplifier 42 into an integrating amplifier 46 for a given amount of time and then after the shutter is closed the current is integrated through the –1 gain of amplifier 44 for an equal amount of time. This operation is known as dual slope, correlated double sampling, and it eliminates the effects of dark current and KTC noise. It differs from dual sample CDS in that the signal is switched through two different amplifiers depending on whether the signal represents the image data or the background data wherever dual time CDS uses the same amplification chain. Correlated double sampling also reduces Johnson noise, flicker noise, and 1/f noise. A similar effect can be achieved by integrating the current from an opaquely masked photodetector through the –1 gain of amplifier 44. Using an opaquely masked photosensor adjacent to the active photosensitive detector 64 allows the correlated double sampling technique to be implemented in parallel and decreases readout time. The integration of the outputs of the current amplifiers 42 and 44 occurs simultaneously, thus eliminating the need to wait for two integration periods to have output data. However, since separate photosensors are used, small differences in dark current and noise can arise between them.

The integrated signal from the photosensors is then digitized by an analog-to-digital converter (ADC) circuit 56.

The output of the ADC is stored in the memory cells 58 after inversion by the sub-image pixel inverter 48. It is also possible to assign a group of memory cells to each sub-group of photodetectors 22.

The image at each sub-array of hotodetectors is inverted with respect to the other sub-arrays, therefore, means for inverting the image at the sub-array are incorporated in one embodiment as a sub-image pixel inverter 48. This means will consist of mapping the data from one photodetector to a memory location corresponding to a photodetector at a point which is a mirror image of the object reflected about the center of the sub-array. It is also an embodiment of the invention to have the sub-array images inverted by external circuitry or by means of digital image processing.

This allows the resulting sub-images from each sub-group of photodetectors to be stitched together to form a larger composite image. The invention utilizes digital image capture and processing to eliminate the need for an additional array of relay lenslets to invert the sub-images formed by each lenslet. It also eliminates the need for a third array of field lenses that would be used to maintain illumination uniformity across the lenslet's field of view.

The stored digital pixel data is accessed by strobing the memory cells 58 via row and column address decoders, in order to send data to the data bus 50. The incorporation of the row and column address data lines allows for addressing of subsections of the photosensor array 20 for more rapid image readout in a specific area of interest in the image. This is useful in digital cameras which monitor a scene and are only interested in updating the section of the image associated with moving objects.

Figures 7, 8:
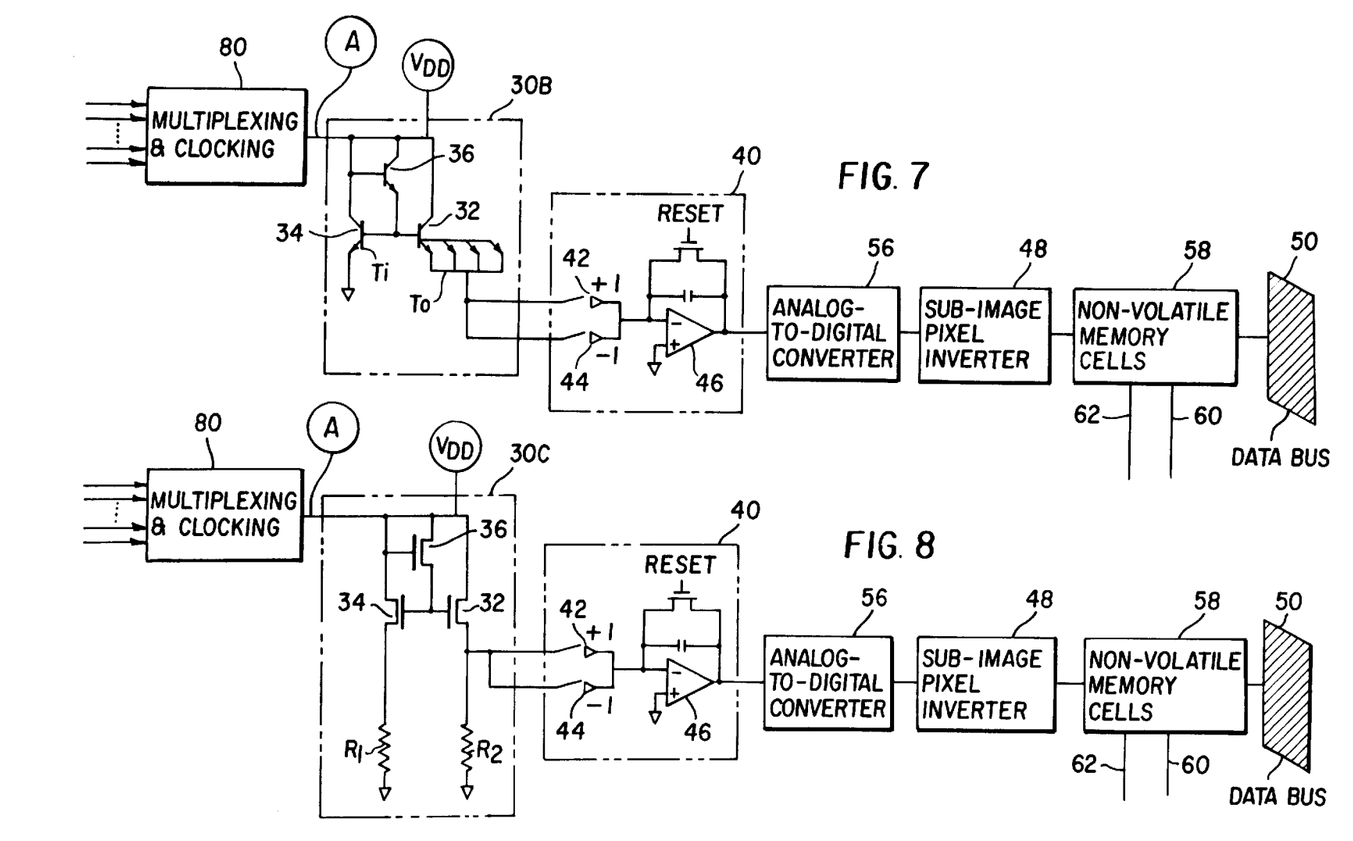
FIG. 7 is a circuit diagram of an alternate embodiment of common circuits that may be used with the unit photodetector elements forming a sub-group of photodetectors.
FIG. 8 is a circuit diagram of another alternate embodiment of common circuits that may be used with the unit photodetector elements forming a sub-group of photodetectors.

Referring now to FIG. 7, a current mirror circuit 30B that may be substituted for the current mirror 30A, provides a second variant of the current mirror function by utilizing an output transistor To emitter or source whose area is n times the area of the emitter or source of the input transistor $T_i$. This forms a smaller circuit which in turn allocates more area to the sub-group of photodetector 22. Current mirror 30B would be substituted for the current mirror 30A at the connection point marked with a circled A.

FIG. 8 illustrates another variant of a current mirror labeled 30C that is connectable to an associated multiplexing and clocking circuit 80 of FIG. 7 at the A labeled point marked with a circle in place of either current mirrors 30A or 30B. The current mirror 30C achieves current multiplication by biasing the emitter base (or gate source) voltage higher on the input side of the current mirror than on the output side. This, more specifically, is accomplished by adjusting the value of R1 and R2. Alternately, a diode junction can be substituted into the emitter or source of the input side of the current mirror 30C in order to provide a fixed voltage bias.

For a bipolar implementation of the multiplying current mirror, this technique can be illustrated by the ebers-moll relation, which is given by $$I_{tr}=I_s*e^{(vbe/kt-1)}$$

where $$V_{bei}=V_{beo}+0.060v$$

allows for a current multiplication of approximately 10× at 300 k.

In operation, data from a subsection of an array can be accessed by using only those addresses that represent the location of data of interest. In this fashion segments of a captured image may be clocked out more rapidly in order to view areas that are capturing rapid scene changes while sampling less active areas less frequently.

If more than one image is stored at each sub-group of photodetectors 22, the length of the addresses are increased accordingly to allow individual access to each of the multiple image data words (pixel image data).

Figure 9:
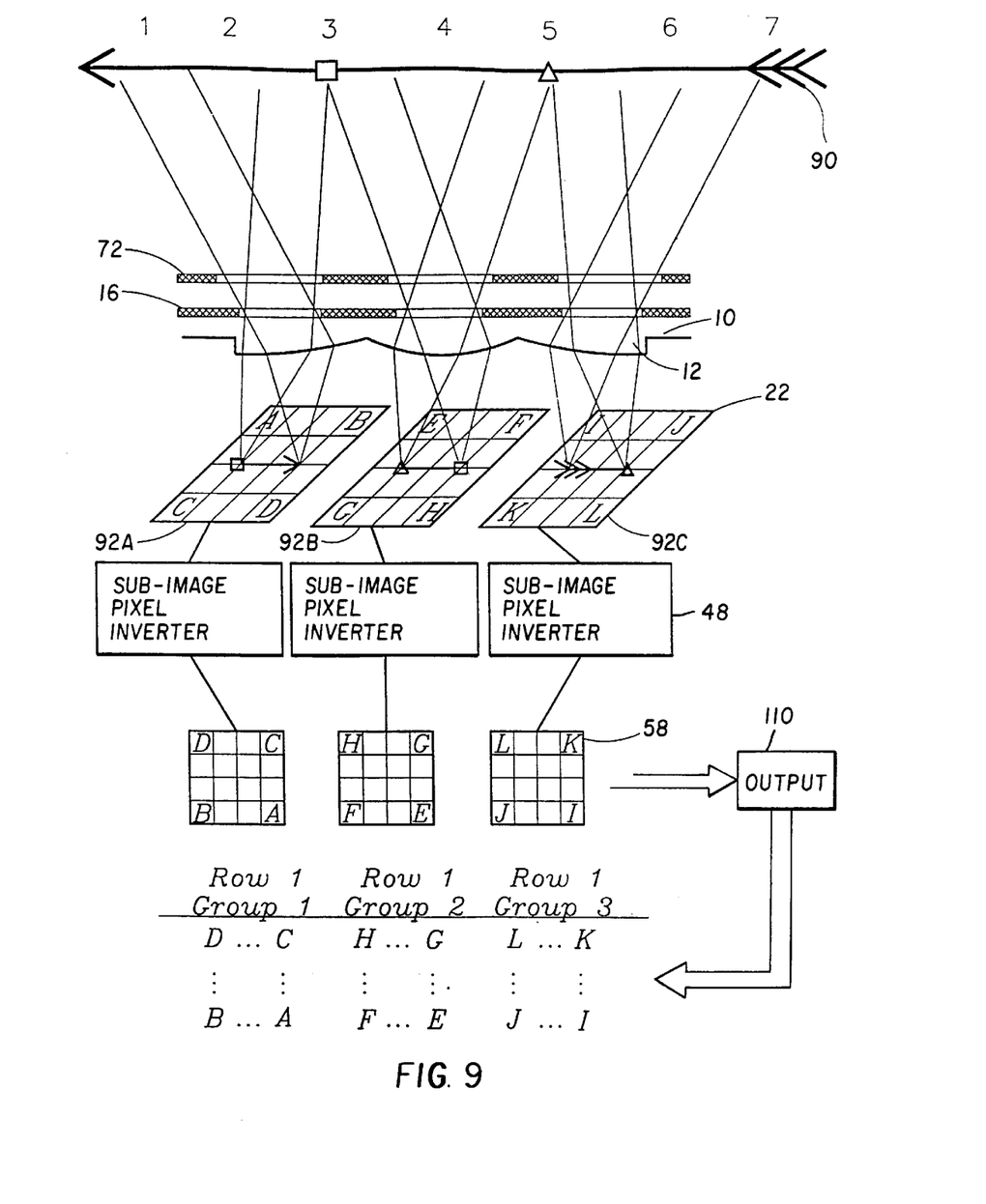
FIG. 9 is a pictorial representation of the operation of a portion of the compact digital camera with segmented fields of view.

Referring next to FIG. 9, an object 90 (arrow) is imaged onto sub-groups of photodetectors 22. Each lenslet 12 views a different segment of the field of view. As a result, the segment 1–3 of the arrow forms an inverted image 92A that impinges on its respective sub-group of photodetectors 22. Likewise the segment 3–5 of the arrow 90 forms an inverted image 92B that impinges on its respective sub-group of photodetectors 22. The same holds true for the segment 5–7 forming the inverted image 92C. Noted in the drawing is that the images 92A through 92C do not form, from left to right, a continuous image of the arrow 90. More specifically, note that point 1 is adjacent point 5 and that point 3 is adjacent point 7 at the surfaces of the sub-group of photodetectors 22. That is, if the sub-images of the arrow 90 were simply stitched together, the overall mosaic (composite) image would be scrambled and unusable.

To arrange the pixel image data in proper order the charges form the matrix of photodetector elements 24 in each sub-group 22 are first clocked out and multiplexed through their respective current multiplying circuit, correlated double sampling circuitry, and digitized by the ADC. The digital data from a pixel, representing an image, in each sub-group of photodetectors 22 is positionally inverted with respect to the center of each sub-group of photodetectors 22. Therefore, a sub-image pixel inverter 48 is needed to take the pixel data from a pixel located at point A and to store it in a memory cell 58 which is inverted with respect to the central pixel of the sub-group of photodetectors. For example, pixel A would be stored in the memory 58 at a location corresponding to D. The overall mosaic composite image is then built up for use by an output device 110, such as a printer or CRT display, by reading the first row from the first sub-image and then adding the first row of the next sub-image till the first rows have all been clocked out. Next the second row from the first image is clocked out and the process continues until the mosaic image is completed with the last pixel being stored in memory location I.

In summary then, the overall image pixel data is generated from the array of sub-groups of photodetectors by digitally stitching the sub-images back together to form a composite image. This is accomplished by taking the row data from each sub-image in turn and adding it to the row data for the next sub-image until the end of the array is reached. Then the address for the next column of row data, at the farthest point on the array, is used to start building the next row of image data by adding the row data from the next sub-image until the end of the line of sub-arrays is reached, at which point the address pointer moves to the beginning of the next column. In some embodiments it may be useful to have some image overlap from one sub-array to the next. This would require the address decoding technique to be able to determine which location in a sub-array row is to be used as the first pixel from that row.

The invention has been described with reference to preferred embodiments. However, it will be appreciated that variations and modifications can be effected by a person of ordinary skill in the art without departing from the scope of the invention.

| PARTS LIST: | |
|---|---|
| 10 | lenslet array |
| 12 | lenslets |
| 14 | mechanical optical axis |
| 15 | lines |
| 16 | opaque mask |
| 18 | local optical axis |
| 20 | photosensor array |
| 22 | sub-groups of photodetectors |
| 24 | photodetector element |
| 30 | current mirror |
| 30A–C | current mirror |
| $32_1$–$32_n$ | gates of the transistors |
| 34 | input side transistor |
| 36 | input side transistor |
| 40 | correlated double sampling circuit |
| 42 | amplifier |
| 44 | amplifier |
| 46 | integrating amplifier |
| 48 | sub-image pixel inverter |
| 50 | data bus |
| 56 | analog-to-digital converter |
| 58 | memory |
| 60 | row address decoder |
| 62 | column address decoder |
| 64 | photosensitive detector |
| 65 | transfer gate |
| 66 | reset gate |
| 70 | spacers |
| 72 | field stop aperture plate |
| 80 | multiplexing and clocking circuit |
| 90 | object (arrow) |
| 92A | inverted image |
| 92B | inverted image |
| 92C | inverted image |
| 100 | supporting substrate |
| 110 | output device |

I claim:
1. A compact digital camera, comprising:
   a lenslet array comprised of a plurality of lenslets, each lenslet having a decentration corresponding to its radial position in the lenslet array so that the axial ray of each lenslet views a different segment of a total field of view;
   a photosensor array comprised of a plurality of sub-groups of photodetectors, each sub-group comprising a plurality of photodetectors and being positioned along the axial ray of a respective lenslet;
   a plurality of electronic arrays dispersed in the spaces between the spaced apart sub-groups of photodetectors, each of the arrays configured to one of the sub-groups for receiving the provided output signals from the sub-group that the array is associated with, the array having electronics to amplify, digitize, invert, and store, the provided output signals to facilitate image capture; and
   a field limiting baffle comprised of at least one aperture plate where the center of the apertures are positioned to lie along the axial ray of a respective lenslet;
   array electronics comprising:
      a plurality of current multipliers, corresponding in number to the number of sub-groups of radiation sensors, each connected to a respective sub-group for receiving the outputs of the radiation sensors in the sub-group;
      a corresponding plurality of analog-to-digital converters, each connected to an associated current multiplier;
      a corresponding plurality of inverters for digitally inverting the sub-images from said analog-to-digital converters; and a corresponding plurality of storage devices connected to receive the digitally inverted sub-images from corresponding inverters for storing the provided digitally inverted sub-images.

2. A compact digital camera, according to claim 1 wherein said lenslets have an a spherical surface.

3. A compact digital camera according to claim 2 wherein said lenslets additionally have an a spherical surface whose profile varies as a function of its radial position in the lenslet array.

4. A compact digital camera, comprising:

a lenslet array comprised of a plurality of lenslets, each lenslet having a decentration corresponding to its radial position in the lenslet array so that the axial ray of each lenslet views a different segment of a total field of view;

a color photosensor array comprised of a plurality of sub-groups of photodetectors wherein each sub-group of photodetectors is comprised of sets of Red, Green, and Blue color sensitive photodetectors, each sub-group of photodetectors being positioned along the axial ray of a respective lenslet;

a plurality of electronic arrays dispersed in the spaces between the spaced apart sub-groups of photodetectors, each of the arrays configured to one of the sub-groups for receiving the provided output signals from the sub-group that the array is associated with, the array having electronics to amplify, digitize, invert, and store, the provided output signals to facilitate image capture; and a field limiting baffle comprised of at least one aperture plate where the center of the apertures are positioned to lie along the axial ray of a respective lenslet;

array electronics comprising:

a plurality of current multipliers, corresponding in number to the number of sub-groups of radiation sensors, each connected to a respective sub-group for receiving the outputs of the radiation sensors in the sub-group;

a corresponding plurality of analog-to-digital converters, each connected to an associated current multiplier;

a corresponding plurality of inverters for digitally inverting the sub-images from said analog-to-digital converters; and a corresponding plurality of storage devices connected to receive the digitally inverted sub-images from corresponding inverters for storing the provided digitally inverted sub-images.

5. A compact digital camera, according to claim 4 and further comprising:

a plurality of baffles extending between each lenslet and a corresponding sub-group of photodetectors so as to prevent stray light from one lenslet impinging on one or more of the photodetectors in an adjacent sub-group of photodetectors.

6. A compact digital camera according to claim 2 wherein each of said lenslets has a surface that is a diffractive/refractive hybrid to eliminate chromatic aberration.

7. A compact digital camera according to claim 6 wherein said lenslets have a diffractive/refractive surface whose profile varies as a function of its radial position in the lenslet array.

8. A compact image capture device comprising:

an array of spaced apart sub-groups of radiation sensors for providing output signals that are a function of the incident radiation from an image onto each radiation sensor of a sub-group, each sub-group having a plurality of radiation sensors;

a plurality of electronic arrays dispersed in the spaces between the spaced apart sub-groups of radiation sensors, each of the arrays configured to one of the sub-groups for receiving the provided output signals from the sub-group that the array is associated with, the array having electronics to amplify, digitize, invert, and store, the provided output signals to facilitate image capture;

a lens array positioned so as to focus the radiation of an image to be captured onto said radiation sensors;

array electronics comprising:

a plurality of current multipliers, corresponding in number to the number of sub-groups of radiation sensors, each connected to a respective sub-group for receiving the outputs of the radiation sensors in the sub-group;

a corresponding plurality of analog-to-digital converters, each connected to an associated current multiplier;

a corresponding plurality of inverters for digitally inverting the sub-images from said analog-to-digital converters; and a corresponding plurality of storage devices connected to receive the digitally inverted sub-images from corresponding inverters for storing the provided digitally inverted sub-images.

9. The compact image capture device according to claim 8 further comprising:

a plurality of multiplexing means each connecting the radiation sensors of an associated sub-group to an associated current multiplier.

10. The compact image capture device according to claim 8 and further comprising:

an associated multiplying current mirror for each of the sub-groups;

a plurality of multiplexing means each connecting the radiation sensors of a sub-group to the associated multiplying current mirror.

11. The compact image capture device according to claim 8 and further comprising:

means for stitching together the sub-image pixel signals from each sub-group of radiation sensors so as to form a group of pixel signals that may be used to replicate the captured image.

12. An image capturing device comprising:

an array of spaced apart groups of radiation sensors for providing output signals that are a function of the color of incident radiation from an image onto each radiation sensor;

a plurality of electronic arrays dispersed in the spaces between the spaced apart groups of radiation sensors, each of the arrays configured to one of the groups for receiving from the group that the array is associated with, the array having electronics for amplifying, digitizing, inverting, and storing the provided output signals; and a lens array positioned so as to focus the radiation from an image to be captured onto associated ones of the radiation sensors in each of the groups of said radiation sensors such that each radiation sensor in a group provides an output signal that is stored as a function of the color of the sensed radiation;

array electronics comprising
- a plurality of current multipliers, corresponding in number to the number of sub-groups of radiation sensors, each connected to a respective sub-group for receiving the outputs of the radiation sensors in the sub-group;
- a corresponding plurality of analog-to-digital converters, each connected to an associated current multiplier;
- a corresponding plurality of inverters for digitally inverting the sub-images from said analog-to-digital converters; and
- a corresponding plurality of storage devices connected to receive the digitally inverted sub-images from corresponding inverters for storing the provided digitally inverted sub-images.

13. A compact digital camera, comprising:

a lenslet array comprised of a plurality of lenslets, each lenslet having a decentration corresponding to its radial position in the lenslet array so that the axial ray of each lenslet views a different segment of a total field of view;

a photosensor array comprised of a plurality of spaced apart sub-groups of photodetectors such that there are a plurality of photodetectors associated with each sub-group, each sub-group positioned along the axial ray of a respective lenslet for providing output signals as a function of incident light;

a plurality of electronic circuits formed in the space between the spaced apart sub-groups, each of the electronics circuits being dedicated to one of the sub-groups and connected to receive, amplify, and invert the output signals provided by the photodetectors of that respective sub-group;

a field limiting baffle comprised of at least one aperture plate having a plurality of apertures, corresponding in number to the number of lenslets, where the center of each aperture is positioned to lie along the axial ray of a respective lenslet;

means for receiving the amplified and inverted output signals from said electronic circuits and for stitching the output signals together so as to enable the viewing of a continuous image when the stitched output signals are used to drive an output display device;

array electronics comprising:
- a plurality of current multipliers, corresponding in number to the number of sub-groups of radiation sensors, each connected to a respective sub-group for receiving the outputs of the radiation sensors in the sub-group;
- a corresponding plurality of analog-to-digital converters, each connected to an associated current multiplier;
- a corresponding plurality of inverters for digitally inverting the sub-images from said analog-to-digital converters; and
- a corresponding plurality of storage devices connected to receive the digitally inverted sub-images from corresponding inverters for storing the provided digitally inverted sub-images.

14. The compact digital camera according to claim 13 herein said electronic circuits further comprise:

an inverter for inverting the output signals from said photosensor array.

15. The compact digital camera according to claim 13 and further comprising:

storage means formed in the space between the spaced apart sub-groups of photodetectors for storing the amplified and inverted output signals from said electronic circuits.

* * * * *